United States Patent
Wang et al.

(10) Patent No.: US 12,076,855 B2
(45) Date of Patent: Sep. 3, 2024

(54) WEARABLE CABLE-DRIVEN ROBOTIC ARM SYSTEM

(71) Applicant: NANJING UNIVERSITY OF AERONAUTICS AND ASTRONAUTICS, Nanjing (CN)

(72) Inventors: Yaoyao Wang, Nanjing (CN); Hao Fu, Nanjing (CN); Bai Chen, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 106 days.

(21) Appl. No.: 17/926,833

(22) PCT Filed: Jan. 28, 2021

(86) PCT No.: PCT/CN2021/074171
§ 371 (c)(1),
(2) Date: Nov. 21, 2022

(87) PCT Pub. No.: WO2021/238293
PCT Pub. Date: Dec. 2, 2021

(65) Prior Publication Data
US 2023/0191590 A1  Jun. 22, 2023

(30) Foreign Application Priority Data

May 25, 2020 (CN) .......................... 202010449127.7

(51) Int. Cl.
*B25J 9/00* (2006.01)
*B25J 9/10* (2006.01)
(Continued)

(52) U.S. Cl.
CPC ........... *B25J 9/0006* (2013.01); *B25J 9/0087* (2013.01); *B25J 9/1045* (2013.01); *B25J 9/108* (2013.01);
(Continued)

(58) Field of Classification Search
CPC ........ B25J 9/0021; B25J 9/1694; B25J 9/162; B25J 9/161; B25J 9/108; B25J 9/1045;
(Continued)

(56) References Cited

FOREIGN PATENT DOCUMENTS

| CN | 105662782 A | * | 6/2016 | ........... A61H 1/0274 |
| CN | 105662783 A | * | 6/2016 | ........... A61H 1/0274 |

(Continued)

*Primary Examiner* — T. Scott Fix
(74) *Attorney, Agent, or Firm* — CBM PATENT CONSULTING, LLC

(57) ABSTRACT

A wearable cable-driven robotic arm system includes a wearing mechanism, two robotic arms located on two sides of the wearing mechanism, cable driving devices, a load trolley, and a motor controller, where the cable driving devices are divided into driving portions and driven portions, heavy objects, such as electric motors, of the driving portions are arranged in the load trolley, thereby reducing loads born by the wearable robotic arms, the load trolley can travel with a person by means of sleeves or can be controlled by the motor controller to move by means of signals measured by following modules, the driven portions are combined with the robotic arms, and are double-cable driven, thereby reducing weight of the robotic arms, and a brain-computer interface module is used for controlling the driving devices, thereby controlling the robotic arms more accurately.

7 Claims, 5 Drawing Sheets

(51) Int. Cl.
  *B25J 13/08* (2006.01)
  *B25J 17/02* (2006.01)
  *B25J 18/04* (2006.01)
(52) U.S. Cl.
  CPC ........... *B25J 13/08* (2013.01); *B25J 17/0258* (2013.01); *B25J 18/04* (2013.01)
(58) Field of Classification Search
  CPC ........ B25J 9/0087; B25J 9/0006; B25J 18/04; B25J 17/0258; B25J 17/1308; B25J 13/08
  USPC ...................................... 74/490.06
  See application file for complete search history.

(56) References Cited

FOREIGN PATENT DOCUMENTS

| | | | | |
|---|---|---|---|---|
| CN | 106393073 A | * | 2/2017 | ........... A61H 1/0277 |
| CN | 106420256 A | * | 2/2017 | ........... A61H 1/0277 |
| JP | 2015077354 A | * | 4/2015 | |

* cited by examiner

WEARABLE CABLE-DRIVEN ROBOTIC ARM SYSTEM

TECHNICAL FIELD

The present disclosure relates to the field of mechanical assistance, and in particular to a wearable cable-driven robotic arm system.

BACKGROUND ART

With aggravation of the aging of the population and the change of people's work concept, the problem of labor shortage has become increasingly prominent. The proportion of migrant workers over 50 years old in China has increased year by year, and the construction industry, low-end manufacturing industry and other industries having high labor intensity and poor working environment are increasingly not recognized by young people. Therefore, solving labor shortage and improving working conditions have become a problem to be solved for the development of China and even the world.

With development and gradual maturity of the robot technology, large-scale application of robots has become one of the important directions to solve the problem of labor shortage. However, the current robots are not enough to automatically recognize human intentions and work according to the human intentions.

With development of the computer technology, the electroencephalogram acquisition technology and the pattern recognition discipline, research on the brain computer interface technology is gradually rising. People can utilize electroencephalogram signals to output information to the outside world, control external devices, and assist human bodies to complete work tasks.

With limitations of space, scale, technology, cost and other conditions, it is not realistic to use highly automated production lines in aircraft manufacturing, aviation assembly, construction and other industries. Therefore, seeking human-machine cooperation and reducing labor intensity of workers as much as possible have gradually become an important direction for development of the robots in related industries.

In terms of human-computer cooperation, wearable cooperative machines can greatly supplement or expand people's working ability by fixing robotic arms or manipulators on human trunks or limbs, for example, assist human bodies to carry heavy objects, complete precise or cumbersome assembly work, and replace human hands in working in high-risk environments, thereby improving work efficiency and safety.

Wearable robotic arms existing at the present stage have the following problems: 1) the traditional wearable robotic arms have heavy structures and high energy consumption. Heavy driving units are directly mounted at joints of the manipulators, which increases the inertia and size of arm bodies, resulting in significant increase in work energy consumption and dynamic coupling between the human bodies and the wearable robotic arms, such that it is difficult to ensure satisfactory work precision and endurance. 2) The apparatus integrally includes a robotic arm structure, several driving motors and batteries, which are too heavy and likely to cause discomfort to wearers.

Through the search of the existing technical literature, it is found:

The patent document with the publication No. being CN 104825258 A of the Chinese patent disclosed a shoulder wearable functional auxiliary robotic arm. This technology designs a seven degree of freedom cable-driven double arm, which overcomes, to some extent, the problem of low dead weight ratio of a traditional joint motor-driven robotic arm. However, a large number of motors, batteries and other heavy objects are carried on wearer's shoulders, which leads to large loads on the wearers for a long time, and greatly reduces wearing comfort.

SUMMARY

Invention objective: in view of the above defects, the present disclosure provides a wearable cable-driven robotic arm system, which uses lightweight driving devices to drive robotic arms and transfers driving portions of the driving devices onto a load trolley, so as to solve the problem of large wearing loads.

Technical solution: in order to solve the above problem, the present disclosure uses the following technical solution:

A wearable cable-driven robotic arm system includes a wearing mechanism, two robotic arms located on two sides of the wearing mechanism, cable driving devices, a load trolley, and a motor controller, where the two robotic arms are fixed on the two sides of the wearing mechanism respectively;

Each of the cable driving devices includes a driving portion and a driven portion, the driving portion being arranged in the load trolley, the driven portion being combined with the robotic arm, to drive the robotic arm to move, the driving portion being connected to the driven portion by means of a cable, the driving portion driving the driven portion to move, and the motor controller being arranged in the load trolley and being used for controlling the driving portion of the cable driving device; and the load trolley includes a housing and casters.

Beneficial Effects

The robotic arm system uses a cable-driven mode, and the driving portions of the driving devices are arranged in the load trolley, thereby reducing the weight and size of the robotic arms without bearing the driving portions of the driving devices, reducing loads on a human body, and improving wearing comfort.

Further, the wearable cable-driven robotic arm system includes a first following module and two second following modules, where the first following module is mounted in a center of a back surface of the wearing mechanism, and the two second following modules are located on two sides of a bottom in the load trolley respectively, and are close to a front side of the load trolley; and the first following module and the second following modules are used for measuring distances and angles and sending signals to the motor controller.

Further, the load trolley includes a first caster, a second caster, a first caster driving motor, a second caster driving motor, and two universal wheels, the first caster and the second caster being located on a left side and a right side of the load trolley respectively, the first caster being connected to the first caster driving motor, the second caster being connected to the second caster driving motor, the two universal wheels being mounted on a front side and a rear side of the load trolley respectively, and the first caster driving motor and the second caster driving motor being controlled by the motor controller.

Further, the cable driving device of each of the robotic arms includes a waist joint cable, a shoulder joint cable, an elbow joint cable, and a wrist joint cable that pass through the waist joint sleeve, a shoulder joint sleeve, an elbow joint sleeve, and the wrist joint sleeve respectively, one ends of all the sleeves being fixed to a waist module support, and the other ends of all the sleeves being fixed to one side of the load trolley.

Further, each of the robotic arms includes a waist module support, a big arm, a small arm and an end effector, the waist module supports being fixed to the two sides of the wearing mechanism, one end of the big arm being fixed on the waist module support, the other end of the big arm being hinged to one end of the small arm, and the other end of the small arm being hinged to the end effector.

Further, the waist module support includes a support housing, a first bearing seat, a second bearing seat, a cylindrical roller bearing, deep groove ball bearings, a waist module conversion shaft, waist joint guide wheels, and a waist joint cable, the first bearing seat being fixed above an interior of the support housing, and being a hollow cylinder accommodating the cylindrical roller bearing, the second bearing seat being fixed below the interior of the support housing, and supporting and accommodating the deep groove ball bearings, and in addition, the two deep groove ball bearings being fixed to each of a left side and a right side of the interior of the support housing, axes of the two deep groove ball bearings and an axis of the deep groove ball bearing fixed on the second bearing seat being located at the same height, the waist module conversion shaft passing through the deep groove ball bearing on the second bearing seat and being fixed in the deep groove ball bearings on the left side and the right side of the interior of the support housing, and the two waist joint guide wheels being fixedly mounted on the waist module conversion shaft, and being located on two sides of the deep groove ball bearing on the second bearing seat respectively; and The big arm includes a waist joint rotating shaft, a waist joint support, and two big arm plates hinged to the waist joint support, the waist joint support including a base and two supports fixed on two sides above the base, the two big arm plates being hinged to the two supports respectively, the waist joint rotating shaft being fixed below the waist joint support, and being fixedly mounted in the cylindrical roller bearing, and the waist joint cable being wrapped around the waist joint rotating shaft and passing through the waist joint guide wheels.

Further, the end effector includes a lower wrist joint support, an upper wrist joint support, and a manipulator, one side of the lower wrist joint support being fixedly connected to the small arm, the other side of the lower wrist joint support being connected to the upper wrist joint support, and the other side of the upper wrist joint support being fixedly connected to the manipulator.

Further, the driving portion of the cable driving device includes a waist joint driving motor, a shoulder joint driving motor, an elbow joint driving motor, a wrist joint driving motor, a waist joint driving capstan fixedly mounted coaxial with the waist joint driving motor, a shoulder joint driving capstan fixedly mounted coaxial with the shoulder joint driving motor, an elbow joint driving capstan fixedly mounted coaxial with the elbow joint driving motor, and a wrist joint driving capstan fixedly mounted coaxial with the wrist joint driving motor, the waist joint cable being wrapped around the waist joint driving capstan, a shoulder joint cable being wrapped around the shoulder joint driving capstan, a first elbow joint cable being wrapped around the elbow joint driving capstan, and a first wrist joint cable being wrapped around the wrist joint driving capstan;

The driven portion of the cable driving device includes the waist joint rotating shaft, the two waist joint guide wheels, a shoulder joint rotating shaft, a first elbow joint rotating shaft, a second elbow joint rotating shaft, a first wrist joint rotating shaft, a second wrist joint rotating shaft, a shoulder joint driven capstan, a first elbow joint driven capstan, a second elbow joint driven capstan, a third elbow joint driven capstan, a first wrist joint driven capstan, a second wrist joint driven capstan, a third wrist joint driven capstan, elbow joint guide wheels, an elbow joint plastic coated bearing, wrist joint guide wheels, a first wrist joint plastic coated bearing, and a second wrist joint plastic coated bearing;

The waist joint driving capstan is connected to the waist joint rotating shaft by means of the waist joint cable, and the waist joint cable midway passes through the two waist joint guide wheels;

The shoulder joint rotating shaft is mounted on the two supports of the waist joint support, and rotatably moves relative to the supports, the shoulder joint rotating shaft is fixedly connected to the big arm plates, the shoulder joint driven capstan is coaxially and fixedly connected to the shoulder joint rotating shaft, and the shoulder joint driving capstan is connected to the shoulder joint driven capstan by means of the shoulder joint cable;

The first elbow joint rotating shaft is mounted on the two supports of the waist joint support, and rotatably moves relative to the supports, the second elbow joint rotating shaft is mounted on the two big arm plates, located at one ends of the big arm plates hinged to the small arm, and rotates relative to the big arm plates, and the second elbow joint rotating shaft is fixedly connected to the small arm; the first elbow joint driven capstan and the second elbow joint driven capstan are coaxially and fixedly connected to the first elbow joint rotating shaft, and the third elbow joint driven capstan is coaxially and fixedly connected to the second elbow joint rotating shaft; the elbow joint driving capstan is connected to the first elbow joint driven capstan by means of the first elbow joint cable, the second elbow joint driven capstan is connected to the third elbow joint driven capstan by means of the second elbow joint cable, and the second elbow joint cable midway sequentially passes through the elbow joint guide wheels and the elbow joint plastic coated bearing;

The first wrist joint rotating shaft is mounted to the two supports of the waist joint support, and rotatably moves relative to the supports, and the second wrist joint rotating shaft is mounted on the lower wrist joint support, rotates relative to the lower wrist joint support, and is fixedly connected to the upper wrist joint support; the first wrist joint driven capstan and the second wrist joint driven capstan are coaxially and fixedly connected to the first wrist joint rotating shaft, and the third wrist joint driven capstan is coaxially and fixedly connected to the second wrist joint rotating shaft; and the wrist joint driving capstan is connected to the first wrist joint driven capstan by means of the first wrist joint cable, the second wrist joint driven capstan is connected to the third wrist joint driven capstan by means of the second wrist joint cable, and the second wrist joint cable midway sequentially passes through the wrist joint guide wheels, the first wrist joint plastic coated bearing, and the second wrist joint plastic coated bearing.

Further, a first tensioning pulley is arranged at the shoulder joint driven capstan, a second tensioning pulley is arranged at the third wrist joint driven capstan, and two tensioning pulley blocks are arranged at the driving portion of the cable driving device.

Further, the wearable cable-driven robotic arm system includes a brain-computer interface module, where the brain-computer interface module is used for controlling the motor controller.

DETAILED DESCRIPTION OF THE EMBODIMENTS

Figure 1:
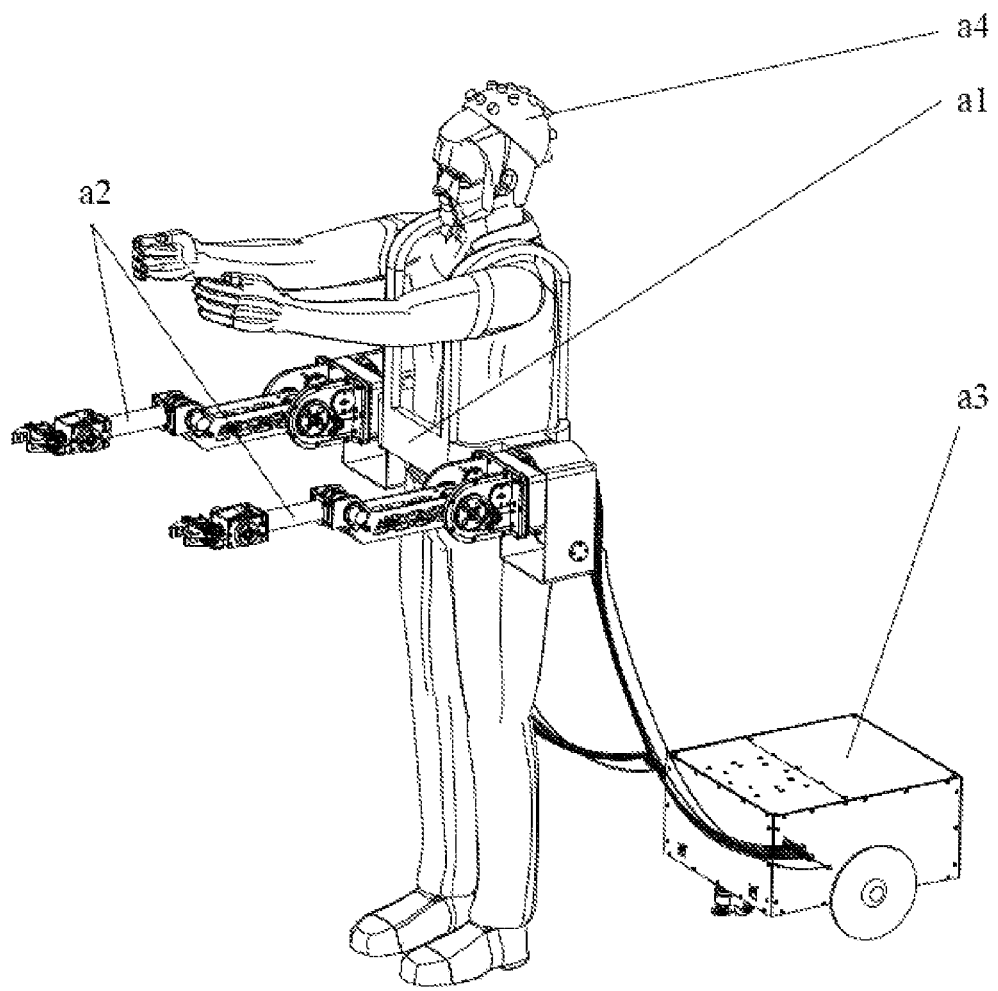
FIG. 1 is a schematic structural diagram of a wearable cable-driven robotic arm system in the present disclosure.
Figure 5:
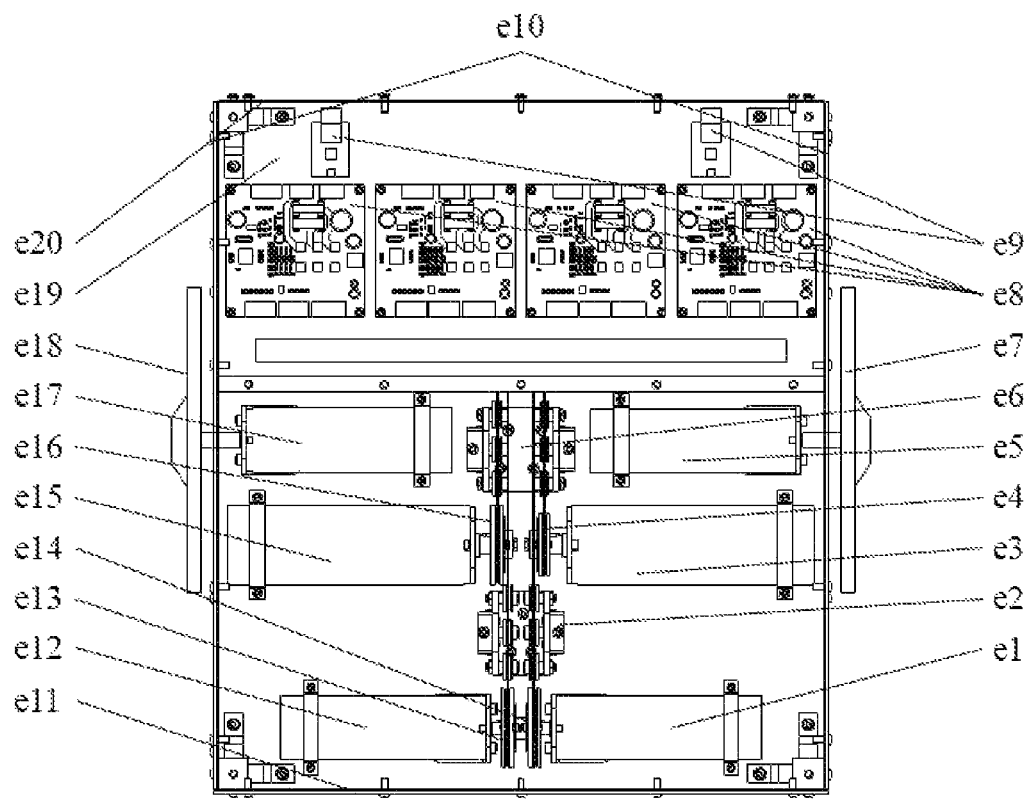
FIG. 5 is a schematic structural diagram of an interior of a load trolley in the present disclosure.

With reference to FIG. 1, a wearable cable-driven robotic arm system includes a wearing mechanism a1, two robotic arms a2 located on two sides of the wearing mechanism a1, cable driving devices, a load trolley a3, a motor controller e8 and a brain-computer interface module a4, where the robotic arms a2 are fixed on the two sides of the wearing mechanism a1, and the wearing mechanism a1 includes a waist fixing plate b2 and extendable shoulder belts b1;

Each of the cable driving devices includes a driving portion and a driven portion, the driving portion being arranged in the load trolley a3, the driven portion being combined with the robotic arm a2, the driving portion being connected to the driven portion by means of a cable, the driving portion driving the driven portion to move, the driven portion driving the robotic arm a2 to move, and the motor controller e8 being arranged in the load trolley a3 and being used for controlling the driving portion of the cable driving device; and as shown in FIG. 5, the load trolley a3 includes a first caster e18, a second caster e7, a first caster driving motor e17, a second caster driving motor e5, and two universal wheels, the first caster e18 and the second caster e7 being located on a left side and a right side of the load trolley a3 respectively, the first caster e18 being connected to the first caster driving motor e17, the second caster e7 being connected to the second caster driving motor e5, the two universal wheels being mounted on a front side and a rear side of the load trolley a3 respectively, and the first caster driving motor e17 and the second caster driving motor e5 being controlled by the motor controller e8 to move.

A first following module b3 is arranged in a center of a back surface of the wearing mechanism a1, the two second following modules e9 are arranged in the load trolley a3, and the second following modules e9 are located on two sides of a bottom in the load trolley a3 respectively, and are close to a front side of the load trolley; and the first following module e3 and the second following modules e9 measure distances and angles of a human body relative to the rear load trolley a3 by means of wireless communication, and send measured signals to the motor controller e8, and the motor controller e8 controls the load trolley a3 to follow the human body to move by controlling rotation of the first caster driving motor e17 and the second caster driving motor e5, thereby reducing a traction of the load trolley by the human body, and further reducing loads on the human body.

The brain-computer interface module a4 is worn on a head of a user, is used for collecting electroencephalogram signals, and then sends the signals to the motor controller e8 by means of wireless signal transmission, thereby controlling the driving motors by means of the motor controller e8. Electroencephalogram control is used, such that the robotic arms are controlled more accurately, and a work principle of the brain-computer interface module has been introduced in detail in the master's thesis "Exploration of Brain-Computer Control Methods of Multi-Joint Robotic Arms" of Meng Xianpeng of Graduate School of the National University of Defense Technology, which is not repeated herein.

Figure 2:
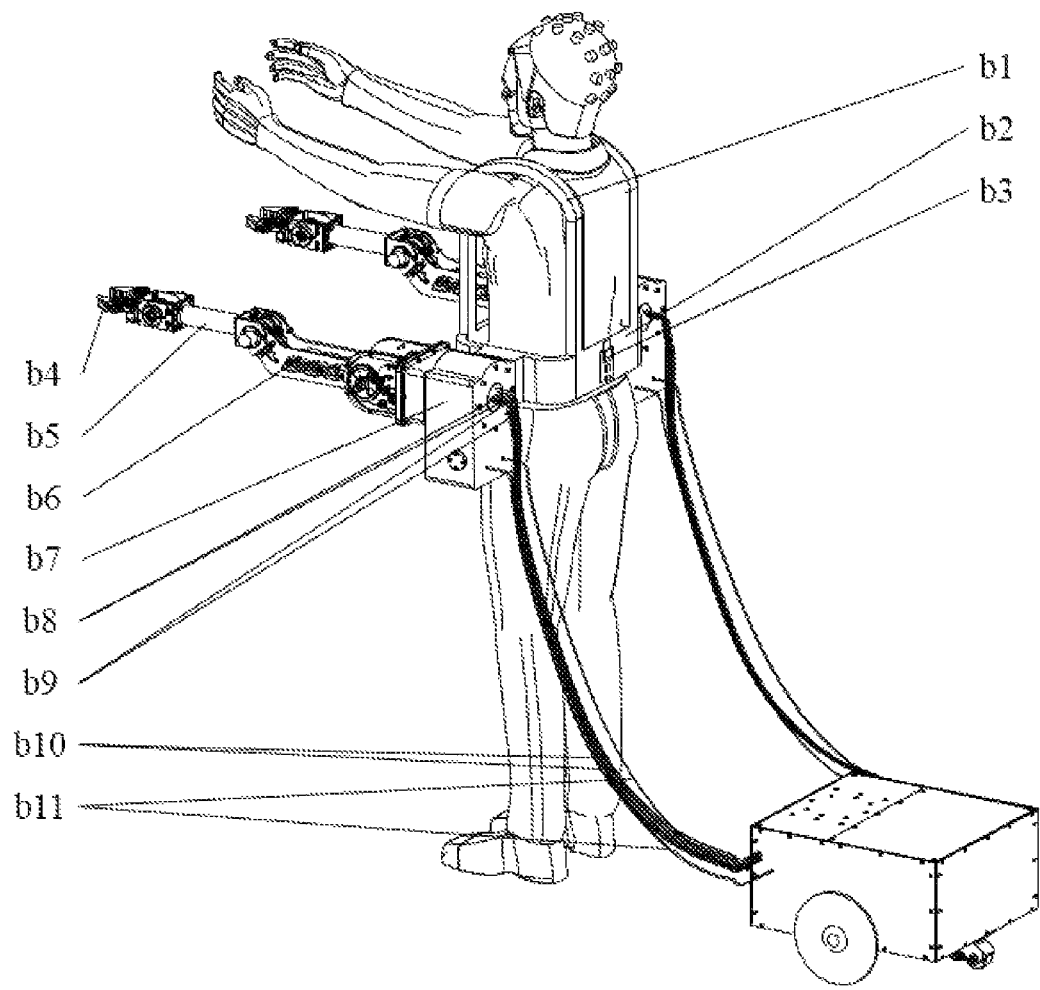
FIG. 2 is a rear view of the wearable cable-driven robotic arm system in the present disclosure.

As shown in FIG. 2, each of the robotic arms a2 includes a waist module support b7, a big arm b6, a small arm b5 and an end effector b4. The waist module supports b7 of the two robotic arms are fixed to the two sides of the wearing mechanism a1 respectively, one end of the big arm b6 is fixed on the waist module support b7, the other end of the big arm is hinged to one end of the small arm b5, and the other end of the small arm b5 is hinged to the end effector b4. The waist module support b7 is connected to the load trolley a3 by means of a sleeve group, one end of the sleeve group is fixed to a rear side of the waist module support b7, the other end of the sleeve group is fixed at one side of the load trolley a3, the sleeve group includes a waist joint sleeve b11, a shoulder joint sleeve b8, an elbow joint sleeve b9, a wrist joint sleeve b10, and the load trolley a3 may move with a person by means of connection of the sleeves when the person walks.

Figure 4:
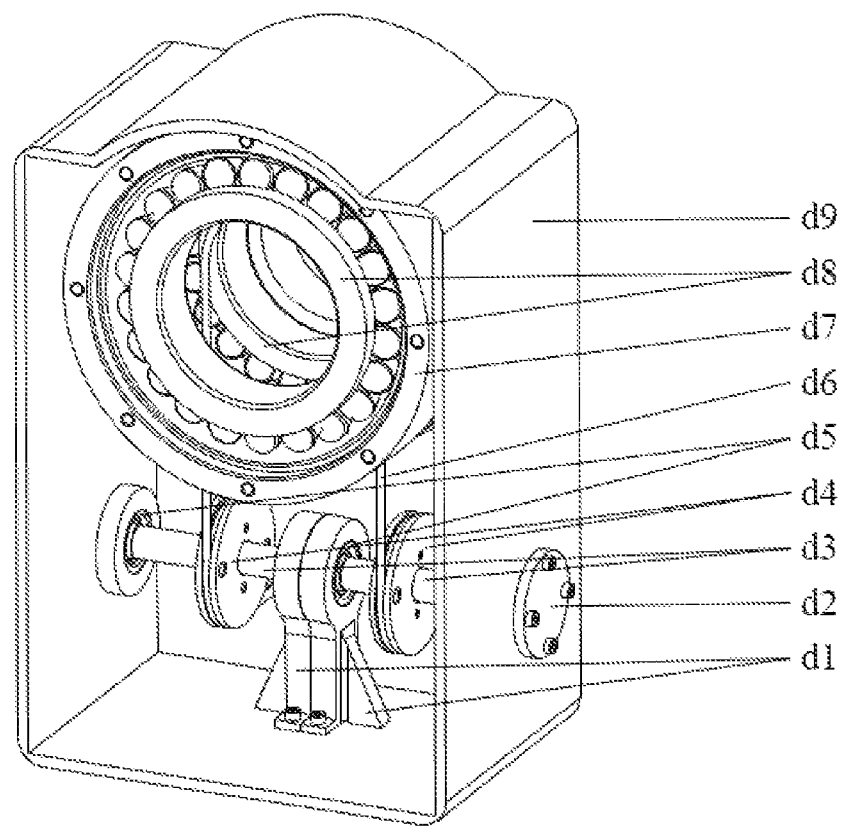
FIG. 4 is a schematic structural diagram of a waist module support in the present disclosure.

As shown in FIG. 4, the waist module support b7 includes a support housing d9, a first bearing seat d7, a second bearing seat d1, a cylindrical roller bearing d8, deep groove ball bearings d5, a waist module conversion shaft d3, waist joint guide wheels d4, and a waist joint cable d6, the first bearing seat d7 being fixed above an interior of the support housing d9, and being a hollow cylinder accommodating the cylindrical roller bearing d8, the second bearing seat d1 being fixed below the interior of the support housing d9, and supporting and accommodating the deep groove ball bearings d5, and in addition, the two deep groove ball bearings d5 being fixed to each of a left side and a right side of the interior of the support housing d9, axes of the two deep groove ball bearings d5 and an axis of the deep groove ball bearing d5 fixed on the second bearing seat d1 being located at the same height, the waist module conversion shaft d3 passing through the deep groove ball bearing d5 on the second bearing seat d1 and being fixed in the deep groove ball bearings d5 on the left side and the right side of the interior of the support housing d9, the two waist joint guide wheels d4 being fixedly mounted on the waist module conversion shaft d3, and the two waist joint guide wheels d4 being located on two sides of the deep groove ball bearing d5 on the second bearing seat d1 respectively.

Figure 3:
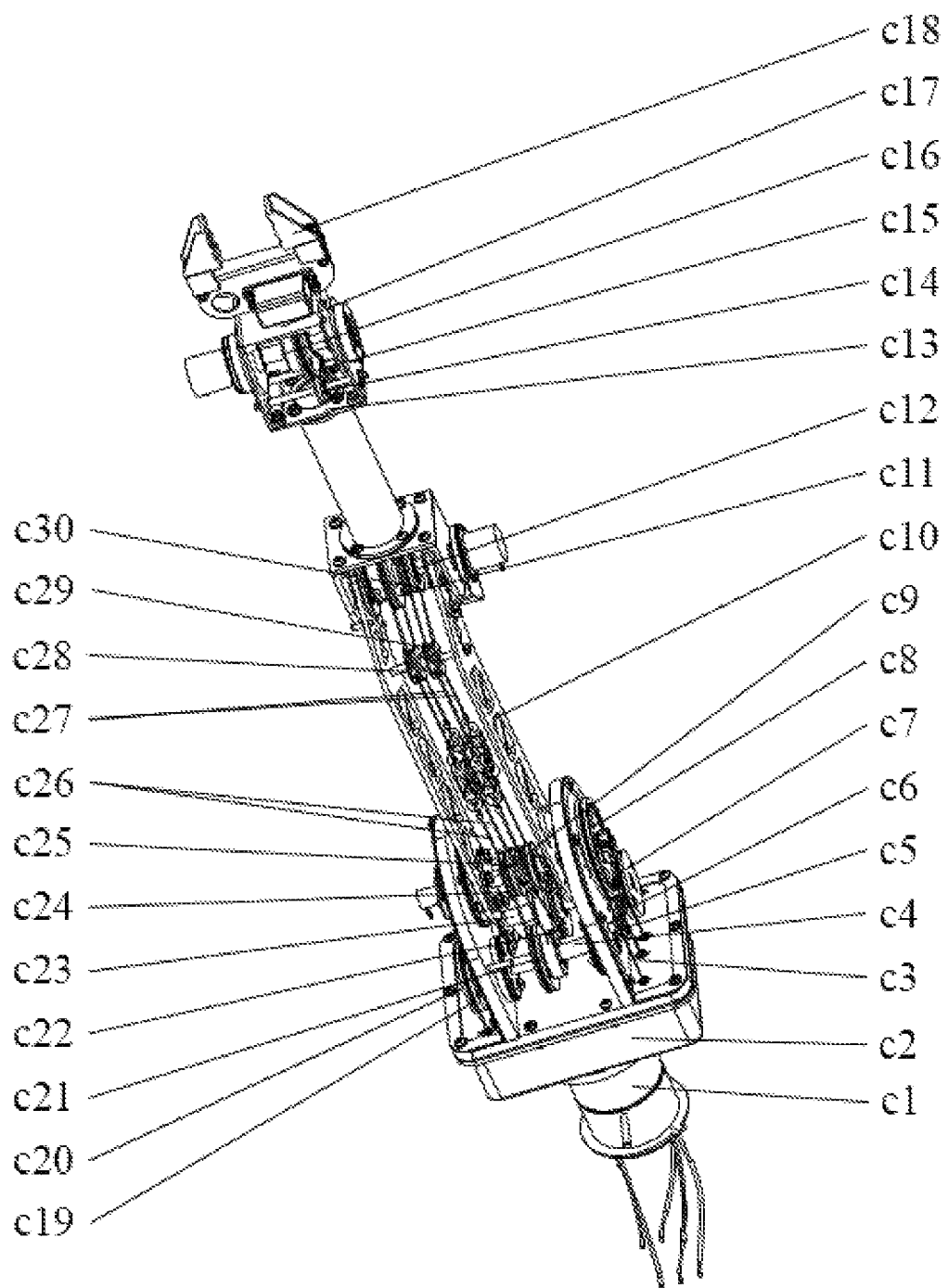
FIG. 3 is a schematic structural diagram of a cable-driven robotic arm in the present disclosure.

As shown in FIG. 3, the big arm b6 includes a waist joint rotating shaft c1, a waist joint support c2, and two big arm plates c10 hinged to the waist joint support, the waist joint support c2 including a base and two supports fixed on two sides above the base, the two big arm plates c10 being hinged to the two supports respectively, the waist joint rotating shaft c1 being fixed below the waist joint support c2, the waist joint rotating shaft c1 being fixedly mounted in the cylindrical roller bearing d8, and the waist joint cable d6 being wrapped around the waist joint rotating shaft c1, passing through the waist joint guide wheels d4, and then penetrating the waist joint sleeve b11.

The end effector b4 includes a lower wrist joint support c13, an upper wrist joint support c17, and a manipulator c18, one side of the lower wrist joint support c13 being fixedly connected to the small arm b5, the other side of the lower wrist joint support being connected to the upper wrist joint support c17, and the other side of the upper wrist joint support c17 being fixedly connected to the manipulator c18.

As shown in FIG. 5, the driving portion of the cable driving device includes a waist joint driving motor e15, a shoulder joint driving motor e3, an elbow joint driving motor e1, a wrist joint driving motor e12, a waist joint driving capstan e16 fixedly mounted coaxial with the waist joint driving motor e15, a shoulder joint driving capstan e4 fixedly mounted coaxial with the shoulder joint driving motor e3, an elbow joint driving capstan e14 fixedly mounted coaxial with the elbow joint driving motor e1, and a wrist joint driving capstan e13 fixedly mounted coaxial with the wrist joint driving motor e12, the waist joint cable d6 being wrapped around the waist joint driving capstan e16, a shoulder joint cable c3 being wrapped around the shoulder joint driving capstan e4, a first elbow joint cable c19 being wrapped around the elbow joint driving capstan e14, and a first wrist joint cable c6 being wrapped around the wrist joint driving capstan e13;

The driven portion of the cable driving device includes the waist joint rotating shaft c1, the two waist joint guide wheels d4, a shoulder joint rotating shaft c9, a first elbow joint rotating shaft c4, a second elbow joint rotating shaft c12, a first wrist joint rotating shaft c23, a second wrist joint rotating shaft c16, a shoulder joint driven capstan c8, a first elbow joint driven capstan c20, a second elbow joint driven capstan c21, a third elbow joint driven capstan c11, a first wrist joint driven capstan c7, a second wrist joint driven capstan c22, a third wrist joint driven capstan c15, elbow joint guide wheels c24, an elbow joint plastic coated bearing c28, wrist joint guide wheels c25, a first wrist joint plastic coated bearing c29, and a second wrist joint plastic coated bearing c30;

The waist joint driving capstan e16 penetrates the waist joint sleeve b11 to be connected to the waist joint rotating shaft c1 by means of the waist joint cable d6, the waist joint cable d6 midway passes through the two waist joint guide wheels d4, and the waist joint driving motor e15 rotates to drive the waist joint driving capstan e16 to rotate, thereby driving the waist joint rotating shaft c1 to rotate, such that the robotic arm a2 rotates with the waist joint rotating shaft c1 as an axis;

The shoulder joint rotating shaft c9 is mounted on the two supports of the waist joint support c2, the shoulder joint rotating shaft c9 rotatably moves relative to the waist joint support c2, the shoulder joint rotating shaft c9 is fixedly connected to the big arm plates c10, the shoulder joint driven capstan c8 is coaxially and fixedly connected to the shoulder joint rotating shaft c9, the shoulder joint driving capstan e4 penetrates the shoulder joint sleeve b8 to be connected to the shoulder joint driven capstan c8 by means of the shoulder joint cable c3, the shoulder joint driving motor e3 rotates to drive the shoulder joint driving capstan e4 to rotate, thereby driving the shoulder joint driven capstan c8 to rotate, and the shoulder joint driven capstan c8 rotates to drive the shoulder joint rotating shaft c9 to rotate, thereby driving the big arm plates c10 to rotate relative to the waist module support c2 with the shoulder joint rotating shaft c9 as an axis;

The first elbow joint rotating shaft c4 is mounted on the two supports of the waist joint support c2, the first elbow joint rotating shaft c4 rotatably moves relative to the supports, the second elbow joint rotating shaft c12 is mounted on the two big arm plates c10, located at one ends of the big arm plates c10 hinged to the small arm b5, and rotates relative to the big arm plates c10, and the second elbow joint rotating shaft c12 is fixedly connected to the small arm b5;

the first elbow joint driven capstan c20 and the second elbow joint driven capstan c21 are coaxially and fixedly connected to the first elbow joint rotating shaft c4, and the third elbow joint driven capstan c11 is coaxially and fixedly connected to the second elbow joint rotating shaft c12; the elbow joint driving capstan e14 is connected to the first elbow joint driven capstan c20 by means of the first elbow joint cable c19, the second elbow joint driven capstan c21 is connected to the third elbow joint driven capstan c11 by means of the second elbow joint cable c26, and the second elbow joint cable c26 midway sequentially passes through the elbow joint guide wheels c24 and the elbow joint plastic coated bearing c28; the elbow joint driving motor e1 rotates to drive the elbow joint driving capstan e14 to rotate, thereby driving the first elbow joint driven capstan c20 to rotate, the first elbow joint driven capstan c20 rotates to drive the first elbow joint rotating shaft c4 to rotate, and then drives the second elbow joint driven capstan c21 to rotate, thereby driving the third elbow joint driven capstan c11 to rotate, and then the third elbow joint driven capstan c11 rotates to drive the second elbow joint rotating shaft c12 to rotate, and drives the small arm b5 to rotate;

The first wrist joint rotating shaft c23 is mounted to the two supports of the waist joint support c2, the first wrist joint rotating shaft c23 rotatably moves relative to the supports, the second wrist joint rotating shaft c16 is mounted on the lower wrist joint support c13, rotates relative to the lower wrist joint support c13, and the second wrist joint rotating shaft c16 is fixedly connected to the upper wrist joint support c17; the first wrist joint driven capstan c7 and the second wrist joint driven capstan c22 are coaxially and fixedly connected to the first wrist joint rotating shaft c23, and the third wrist joint driven capstan c15 is coaxially and fixedly connected to the second wrist joint rotating shaft c16; the wrist joint driving capstan e13 is connected to the first wrist joint driven capstan c7 by means of the first wrist joint cable c6, the second wrist joint driven capstan c22 is connected to the third wrist joint driven capstan c15 by means of the second wrist joint cable c27, and the second wrist joint cable c27 midway sequentially passes through the wrist joint guide wheels c25, the first wrist joint plastic coated bearing c29, and the second wrist joint plastic coated bearing c30; the wrist joint driving motor e12 rotates to drive the wrist joint driving capstan e13 to rotate, thereby driving the first wrist joint driven capstan c7 to rotate, the first wrist joint driven capstan c7 rotates to drive the first wrist joint rotating shaft c23 to rotate, and then drives the second wrist joint driven capstan c22 to rotate, thereby driving the third wrist joint driven capstan c15 to rotate, and then the third wrist joint driven capstan c15 rotates to drive the second wrist joint rotating shaft c16 to rotate, and drives the upper wrist joint support c17 to rotate; and The load trolley a3 includes a first caster e18, a second caster e7, a first caster driving motor e17, a second caster driving motor e5, and two universal wheels, the first caster e18 and the second caster e7 being located on a left side and a right side of the load trolley a3 respectively, the first caster e18 being connected to the first caster driving motor e17, the second caster e7 being connected to the second caster driving motor e5, the two universal wheels being mounted on a front side and a rear side of the load trolley a3 respectively, and the first caster driving motor e17 and the second caster driving motor e5 being controlled by the motor controller e8.

A first tensioning pulley c5 is arranged at the shoulder joint driven capstan c8, a second tensioning pulley c14 is arranged at the third wrist joint driven capstan c15, and two tensioning pulley blocks are arranged at the driving portion of the cable driving device to assist in controlling tensioning of the ropes.

There are a wide range of methods and ways to implement the present disclosure, and what is described above is merely preferred implementations of the present disclosure. It should be pointed out that those of ordinary skill in the art may also make some improvements and modifications without departing from the principle of the present disclosure, and these improvements and modifications should also fall within the scope of protection of the present disclosure.

What is claimed is:

1. A wearable cable-driven robotic arm system, comprising a wearing mechanism, two robotic arms located on two sides of the wearing mechanism, cable driving devices, a load trolley, and a motor controller that is a circuit board for controlling the cable driving device, wherein the two robotic arms are fixed on the two sides of the wearing mechanism respectively;

each of the cable driving devices comprises a driving portion and a driven portion, the driving portion being arranged in the load trolley, the driven portion being combined with the robotic arm, the driving portion being connected to the driven portion by means of a cable, and the motor controller being arranged in the load trolley; and the load trolley comprises a housing and casters; wherein wherein each of the robotic arms comprises a waist module support, a first arm, a second arm and an end effector, the first arm is longer than the second arm; the waist module supports being fixed to the two sides of the wearing mechanism, one end of the first arm being fixed on the waist module support, the other end of the first arm being hinged to one end of the second arm, and the other end of the second arm being hinged to the end effector;

wherein the end effector comprises a lower wrist joint support, an upper wrist joint support, and a manipulator, one side of the lower wrist joint support being fixedly connected to the second arm, the other side of the lower wrist joint support being connected to the upper wrist joint support, and the other side of the upper wrist joint support being fixedly connected to the manipulator.

2. The wearable cable-driven robotic arm system according to claim 1, wherein the load trolley comprises a first caster, a second caster, a first caster driving motor, a second caster driving motor, and two universal wheels, the first caster and the second caster being located on a left side and a right side of the load trolley respectively, the first caster being connected to the first caster driving motor, the second caster being connected to the second caster driving motor, the two universal wheels being mounted on a front side and a rear side of the load trolley, respectively.

3. The wearable cable-driven robotic arm system according to claim 1, comprising a first following module and two second following modules, wherein the first following module is mounted in a center of a back surface of the wearing mechanism, and the two second following modules are located on two sides of a bottom in the load trolley, respectively.

4. The wearable cable-driven robotic arm system according to claim 1, wherein the cable driving device of each of the robotic arms comprises a waist joint cable, a shoulder joint cable, an elbow joint cable, and a wrist joint cable that pass through a waist joint sleeve, a shoulder joint sleeve, an elbow joint sleeve, and a wrist joint sleeve respectively, one ends of all the sleeves being fixed to a waist module support, and the other ends of all the sleeves being fixed to one side of the load trolley.

5. The wearable cable-driven robotic arm system according to claim 1, wherein the waist module support comprises a support housing, a first bearing seat, a second bearing seat, a cylindrical roller bearing, deep groove ball bearings, a waist module conversion shaft, waist joint guide wheels, and a waist joint cable, the first bearing seat being fixed above an interior of the support housing, and being a hollow cylinder accommodating the cylindrical roller bearing, the second bearing seat being fixed below the interior of the support housing, and supporting and accommodating the deep groove ball bearings, and in addition, the two deep groove ball bearings being fixed to each of a left side and a right side of the interior of the support housing, axes of the two deep groove ball bearings and an axis of the deep groove ball bearing fixed on the second bearing seat being located at the same height, the waist module conversion shaft passing through the deep groove ball bearing on the second bearing seat and being fixed in the deep groove ball bearings on the left side and the right side of the interior of the support housing, and the two waist joint guide wheels being fixedly mounted on the waist module conversion shaft, and being located on two sides of the deep groove ball bearing on the second bearing seat respectively; and the first arm comprises a waist joint rotating shaft, a waist joint support, and two first arm plates hinged to the waist joint support, the waist joint support comprising a base and two supports fixed on two sides above the base, the two first arm plates being hinged to the two supports respectively, the waist joint rotating shaft being fixed below the waist joint support, and being fixedly mounted in the cylindrical roller bearing, and the waist joint cable being wrapped around the waist joint rotating shaft and passing through the waist joint guide wheels.

6. The wearable cable-driven robotic arm system according to claim 5, wherein the driving portion of the cable driving device comprises a waist joint driving motor, a shoulder joint driving motor, an elbow joint driving motor, a wrist joint driving motor, a waist joint driving capstan fixedly mounted coaxial with the waist joint driving motor, a shoulder joint driving capstan fixedly mounted coaxial with the shoulder joint driving motor, an elbow joint driving capstan fixedly mounted coaxial with the elbow joint driving motor, and a wrist joint driving capstan fixedly mounted coaxial with the wrist joint driving motor, the waist joint cable being wrapped around the waist joint driving capstan, a shoulder joint cable being wrapped around the shoulder joint driving capstan, a first elbow joint cable being wrapped around the elbow joint driving capstan, and a first wrist joint cable being wrapped around the wrist joint driving capstan;

the driven portion of the cable driving device comprises the waist joint rotating shaft, the two waist joint guide wheels, a shoulder joint rotating shaft, a first elbow joint rotating shaft, a second elbow joint rotating shaft, a first wrist joint rotating shaft, a second wrist joint rotating shaft, a shoulder joint driven capstan, a first elbow joint driven capstan, a second elbow joint driven capstan, a third elbow joint driven capstan, a first wrist joint driven capstan, a second wrist joint driven capstan, a third wrist joint driven capstan, elbow joint guide wheels, an elbow joint plastic coated bearing, wrist joint guide wheels, a first wrist joint plastic coated bearing, and a second wrist joint plastic coated bearing;

the waist joint driving capstan is connected to the waist joint rotating shaft by means of the waist joint cable, and the waist joint cable midway passes through the two waist joint guide wheels;

the shoulder joint rotating shaft is mounted on the two supports of the waist joint support, and rotatably moves relative to the supports, the shoulder joint rotating shaft is fixedly connected to the first arm plates, the shoulder joint driven capstan is coaxially and fixedly connected to the shoulder joint rotating shaft, and the shoulder joint driving capstan is connected to the shoulder joint driven capstan by means of the shoulder joint cable;

the first elbow joint rotating shaft is mounted on the two supports of the waist joint support, the second elbow joint rotating shaft is mounted on the two first arm plates, located at one ends of the first arm plates hinged to the second arm, and the second elbow joint rotating shaft is fixedly connected to the second arm; the first elbow joint driven capstan and the second elbow joint driven capstan are coaxially and fixedly connected to the first elbow joint rotating shaft, and the third elbow joint driven capstan is coaxially and fixedly connected to the second elbow joint rotating shaft; the elbow joint driving capstan is connected to the first elbow joint driven capstan by means of the first elbow joint cable, the second elbow joint driven capstan is connected to the third elbow joint driven capstan by means of the second elbow joint cable, and the second elbow joint cable midway sequentially passes through the elbow joint guide wheels and the elbow joint plastic coated bearing;

the first wrist joint rotating shaft is mounted to the two supports of the waist joint support, and the second wrist joint rotating shaft is mounted on the lower wrist joint support, and is fixedly connected to the upper wrist joint support; the first wrist joint driven capstan and the second wrist joint driven capstan are coaxially and fixedly connected to the first wrist joint rotating shaft, and the third wrist joint driven capstan is coaxially and fixedly connected to the second wrist joint rotating shaft; and the wrist joint driving capstan is connected to the first wrist joint driven capstan by means of the first wrist joint cable, the second wrist joint driven capstan is connected to the third wrist joint driven capstan by means of the second wrist joint cable, and the second wrist joint cable midway sequentially passes through the wrist joint guide wheels, the first wrist joint plastic coated bearing, and the second wrist joint plastic coated bearing.

7. The wearable cable-driven robotic arm system according to claim 6, wherein a first tensioning pulley is arranged at the shoulder joint driven capstan, a second tensioning pulley is arranged at the third wrist joint driven capstan, and two tensioning pulley blocks are arranged at the driving portion of the cable driving device.

\* \* \* \* \*